US007643426B1

(12) United States Patent
Lee et al.

(10) Patent No.: US 7,643,426 B1
(45) Date of Patent: Jan. 5, 2010

(54) PATH SELECTION IN A NETWORK

(75) Inventors: Sung-Ju Lee, Los Altos, CA (US);
Sujata Banerjee, Sunnyvale, CA (US);
Puneet Sharma, Palo Alto, CA (US);
Sujoy Basu, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 425 days.

(21) Appl. No.: 11/412,442

(22) Filed: Apr. 27, 2006

(51) Int. Cl.
*H04L 12/28* (2006.01)
(52) U.S. Cl. .................. 370/238; 370/392; 370/468
(58) Field of Classification Search ......... 370/231–235, 370/238, 386, 252, 254, 395.21; 709/220, 709/225
See application file for complete search history.

(56) References Cited

U.S. PATENT DOCUMENTS

| 6,201,810 B1* | 3/2001 | Masuda et al. ......... 370/395.32 |
| 6,363,319 B1* | 3/2002 | Hsu ........................... 701/202 |
| 6,400,681 B1* | 6/2002 | Bertin et al. ................. 370/218 |
| 6,956,821 B2* | 10/2005 | Szviatovszki et al. ....... 370/237 |
| 2003/0005149 A1* | 1/2003 | Haas et al. ................... 709/238 |
| 2003/0028901 A1* | 2/2003 | Shae et al. ................... 725/146 |
| 2003/0118027 A1* | 6/2003 | Lee et al. ............... 370/395.21 |
| 2003/0156543 A1* | 8/2003 | Sahinoglu et al. ........... 370/238 |
| 2005/0076137 A1* | 4/2005 | Tang et al. ................... 709/238 |
| 2006/0039298 A1* | 2/2006 | Zuniga et al. ............... 370/252 |
| 2007/0053342 A1* | 3/2007 | Sierecki et al. ............. 370/351 |

OTHER PUBLICATIONS

Anderson, D. et al., "Resilient Overlay Networks", MIT Laboratory for Computer Science, downloaded Apr. 27, 2006.
Cha, M. et al., "Placing Relay Nodes for Intra-Domain Path Diversity", downloaded Apr. 27, 2006.
Dovrolis, C. et al., "Packet Dispersion Techniques and Capacity Estimation", Infocom 2001, USENIX.
Fei, T. et al., "How to Select a Good Alternate Path in Large Peer-to-Peer Systems?", downloaded Apr. 27, 2006.
Fonseca, R. et al., "Distributed Querying of Internet Distance Information", downloaded Apr. 27, 2006.
Gummadi, K. et al., "Improving the Reliability of Internet Paths with One-Hop Source Routing", downloaded Apr. 27, 2006.
Hu, N. et al., "Locating Internet Bottlenecks: Algorithms, Measurements, and Implications", Apr. 27, 2004, CMU-CS-04-123.
Jain, M. et al., "Pathload: A Measurement Tool for End-to-End Available Bandwidth", downloaded Apr. 27, 2006.
Kapoor, R. et al., "CapProbe: A Simple and Accurate Capacity Estimation Technique", SIGCOMM'04, Aug. 30-Sep. 3, 2004, Portland Oregon, 2004 ACM.
Katti, S. et al, "MultiQ: Automated Detection of Multiple Bottleneck Capacities Along a Path", IMC'04, Oct. 25-27, 2004, Sicily, Italy, 2004 ACM.

(Continued)

*Primary Examiner*—Derrick W Ferris
*Assistant Examiner*—Mang Yeung

(57) ABSTRACT

A path in a network is selected by selecting candidate overlay paths between two nodes in the network based on a static network metric determined for each of a plurality of overlay paths. A time sensitive network metric is determined for each of the candidate overlay paths, and a path is selected from the candidate overlay paths based on the time sensitive network metrics.

17 Claims, 14 Drawing Sheets

OTHER PUBLICATIONS

Lee, S. et al., "Measuring Bandwidth Between PlanetLab Nodes", Hewlett-Packard Laboratories, Palo Alto, CA, downloaded Apr. 27, 2006.

Prasad, R. S. et al., "Bandwidth Estimation: Metrics, Measurement Techniques, and Tools", downloaded Apr. 27, 2006.

Ribeiro, V. J. et al., "Locating Available Bandwidth Bottlenecks", Sep.-Oct. 2004, IEEE Computer Society, IEEE Internet Computing.

S3 Scalabe Sensing Service, http://networking.hpl.hp.com/s-cube/, downloaded Apr. 27, 2006.

Savage, S. et al., "The End-to-End Effects of Internet Path Selection", downloaded Apr. 27, 2006.

Strauss, J. et al., "A Measurement Study of Available Bandwidth Estimation Tools", IMC'03, Oct. 27-29, 2003, Miami Beach, FL, 2003 ACM.

Wong, B. et al., "Meridian: A Lightweight Network Location Service Without Virtual Coordinates", SIGCOMM'05, Aug. 21-26, 2005, Philadelphia, PA, 2005 ACM.

Xu, Z. et al., "Netvigator: Scalable Network Proximity Estimation", HP Laboratories Palo Alto, HPL-2004-28, Mar. 3, 2005, Internal Accession Date Only.

Zhu, Y. et al., "Dynamic Overlay Routing Based on a Available Bandwidth Estimation: A Simulation Study", downloaded Apr. 27, 2006.

* cited by examiner

NEW OVERLAY PATH

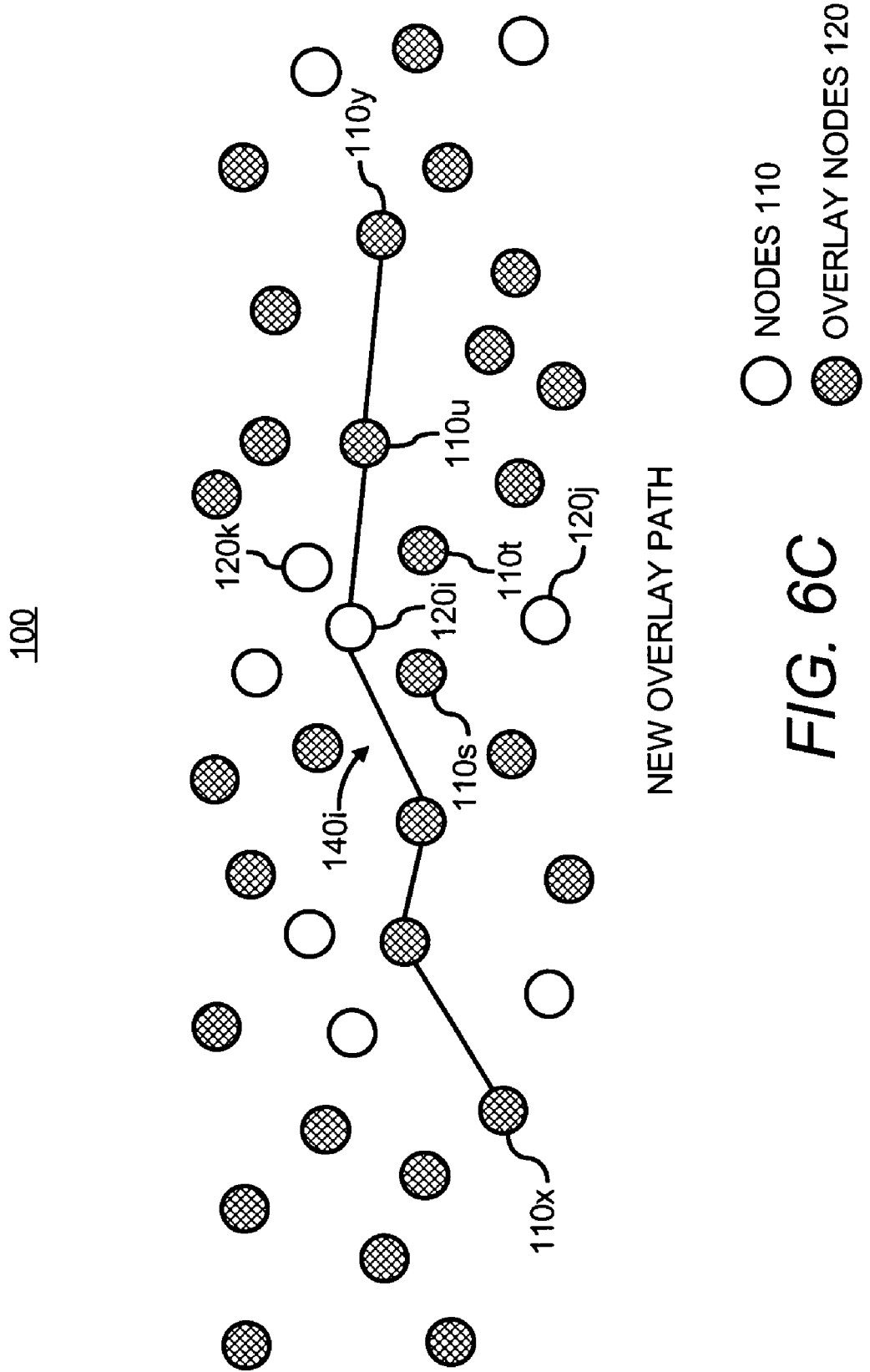

US 7,643,426 B1

PATH SELECTION IN A NETWORK

BACKGROUND

Large networks, such as the Internet, provide the infrastructure for many peer-to-peer systems and are now being used to provide a variety of services to users. Some recent Internet applications require high bandwidth. Live, high-quality, streaming video, video conferencing, and graphic-intensive multiplayer games are examples of high-bandwidth applications.

A fundamental challenge in effectively utilizing high-bandwidth network services is to provide these services and other data transmission without affecting the quality of the services. Routing is a major factor in providing these services. Use of overlay networks and overlay routing to provide these services instead of using the default Internet Protocol (IP) routing has been receiving great interest. It has been shown that overlay routes can give better performance over native IP routes. However, selecting particular overlay routes for actual use that provide better performance than a default IP route is difficult. Metrics, such as latency or loss rate, have been suggested for use in selecting new routes. However, these metrics vary considerably over time, and as a result, a new route selected based on past measurements can provide worse performance than the default IP path by the time the selected new path is implemented.

BRIEF DESCRIPTION OF THE DRAWINGS

Various features of the embodiments can be more fully appreciated, as the same become better understood with reference to the following detailed description of the embodiments when considered in connection with the accompanying figures, in which:

FIGS. 6A-C illustrate selecting an overlay path from candidate overlay paths having overlay nodes closest to a node at a head of a bottleneck link, according to an embodiment;

DETAILED DESCRIPTION OF THE EMBODIMENTS

According to an embodiment, overlay routes in an overlay network are operable to be used for providing network services and other data transmissions. An overlay route may be selected for transmitting data based at least on capacity of the overlay route and the available bandwidth of the overlay route. Capacity is a relatively stable network metric that varies less over time than metrics, such as available bandwidth, latency, loss rate or TCP throughput. In one embodiment, capacity is used to select one or more candidate overlay paths having overlay nodes. Available bandwidth may be used to select a candidate overlay path and its corresponding overlay node for use in providing network services or other data transmissions. Other network metrics, such as latency, loss rate, TCP throughput, etc., may also be used to select the candidate overlay paths or to select an overlay path from the candidate paths.

The capacity of a network path is a transmission rate of a data transmission on the network path, assuming the data transmission has full access to the network path without any other network traffic on the network path.

A network path is a path between two nodes in the network, such as a source node and a destination node. The path may include one or more intermediate nodes with a link between each node. Capacity estimate measurement tools are known in the art and may be used to determine the capacity of a network path. A network path may be an overlay path using an overlay routing protocol or a path using another type of routing protocol, such as a default IP routing scheme. Border gateway protocol (BGP) and routing information protocol (RIP) are examples of IP routing schemes.

The available bandwidth of the network path is the transmission rate of a data transmission on the network path with other network traffic on the network path. The network traffic typically varies over time, so the available bandwidth varies over time. The capacity of the network path, however, is generally less variable because it is not dependent on other network traffic. For example, a default network path may be used for transmission between a source node and a destination node. The capacity of the default network path does not change. However, the default path may be changed due to a change in infrastructure or for other reasons. The change in default path may be detected through a traceroute or other network tool. A new capacity may be measured for the new default path between the source and the destination nodes.

Figure 1:
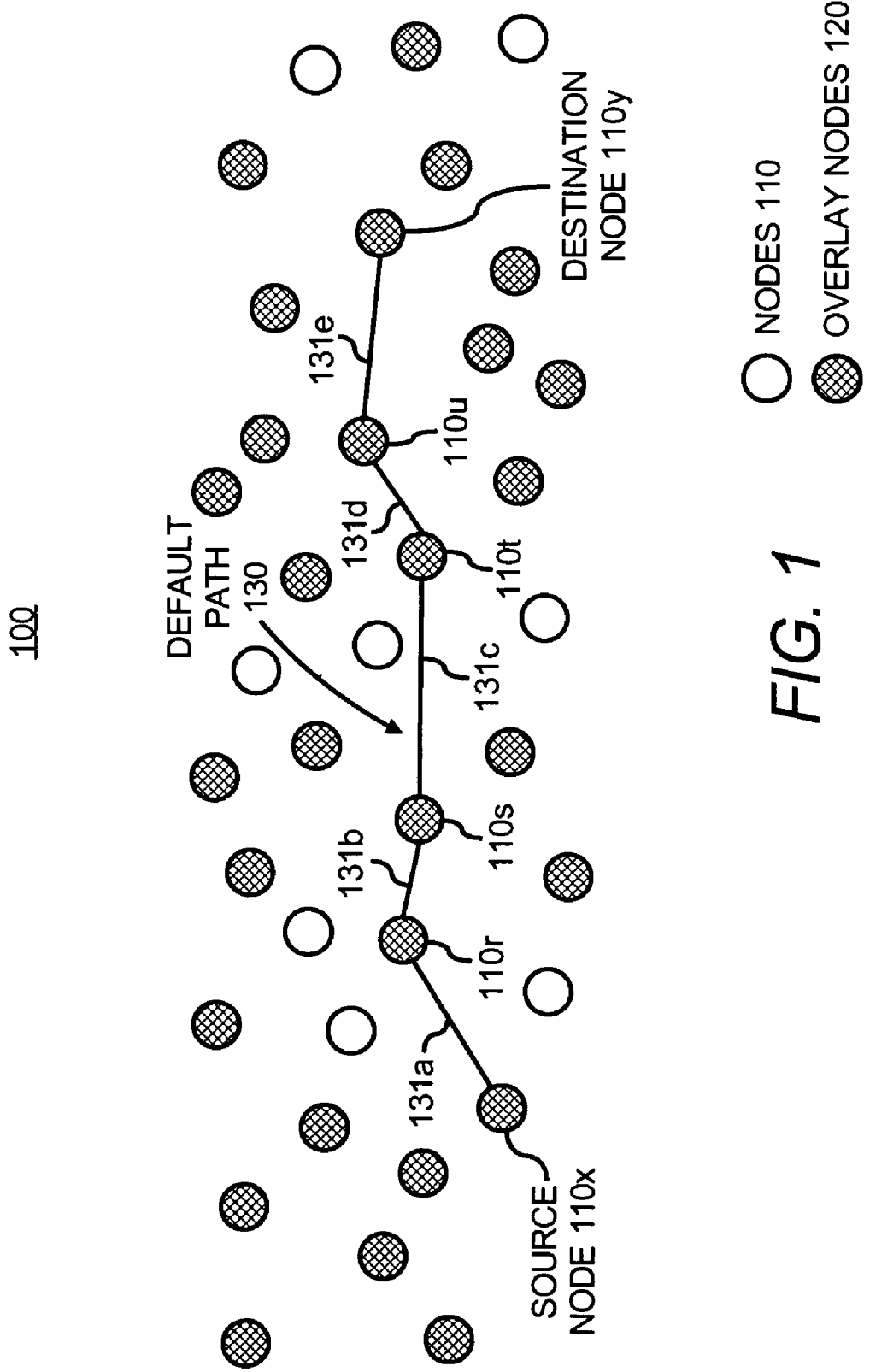
FIG. 1 illustrates a network including nodes and overlay nodes, according to an embodiment.

FIG. 1 illustrates a network 100 including the nodes 110 and an overlay network comprised of the overlay nodes 120. An example of the network 100 includes a large-scale network, such as the Internet, that may provide the infrastructure for many peer-to-peer networks. However, the embodiments may be implemented in smaller networks.

A node is any device that may send and/or receive messages via the network and that is typically operable to perform some type of data processing. Examples of nodes include routers, servers, and end-user devices, such as personal digital assistants (PDAs), personal computers, laptops, and cellular phones.

The overlay nodes 120 are operable to route data in the overlay network using the overlay routing protocol of the overlay network. An overlay network is a logical representation of the underlying physical network 100. The overlay network uses the infrastructure of the underlying physical network 100 to perform overlay routing and possibly other overlay functions depending on the type of overlay network being used. The overlay network including the overlay nodes 120 may include a known type of overlay network, such as a distributed hash table (DHT) overlay network or another type of overlay network. The overlay nodes 120 include software for implementing overlay routing and other functions described herein.

The nodes 110 differ from the overlay nodes 120, because the nodes 110 do not perform overlay routing. The nodes 110 are operable to route data in the network 100. However, the nodes 110 use a different routing protocol.

According to an embodiment, capacity measurements are used to select a set of candidate nodes that may be used for a new overlay path. In one embodiment, the set of candidate nodes are selected if a default network path, which may be the currently used network path, fails to satisfy one or more predetermined standards, such as a standard related to capacity, available bandwidth or other network metrics, or the set of candidate nodes are selected if one or more overlay paths are better at satisfying the standards, such as providing greater available bandwidth or greater capacity or less latency.

FIG. 1 shows a source node 110x and a destination node 110y. A default path 130 between the source node 110x and the destination node 110y includes links 131a-e and intermediate nodes 110r-u. The default path 130, for example, is an IP network path for routing data between the source node 110x and the destination node 110y, as is known in the art. The default path 130 may change due to a change in the network infrastructure, such as nodes joining or leaving the network 100, or may change to other reasons.

A path switching threshold may be used to determine whether to switch from the default path 130 to a new overlay path for routing between the source node 110x and the destination node 110y. Equation 1 below is one embodiment of a path switching threshold. Equation 1 is described with respect to FIG. 2.

$$\alpha*\text{Capacity}(xy) < \min(\text{Capacity}(xa), \text{Capacity}(ay)) \qquad \text{Equation (1)}$$

α is greater than one. According to equation 1, the capacity of an overlay path is greater than α* the current capacity of the default path 130 in order for the overlay path to be selected as a candidate overlay path. "a" represents an intermediate overlay node, such as the overlay node 120a shown in FIG. 2.

The slowest link of a candidate overlay path determines the capacity or the available bandwidth of the of the entire overlay path. This is represented using the minimum function in equation (1). When the overlay path going through an overlay node has a larger capacity than the default path 130, it is advantageous to use such overlay route. However, as overlay paths may have longer hops (and possibly longer latency), switching to overlay paths may not be effective when the bandwidth gain from switching to the overlay path is not substantial. Hence α is used to prevent unnecessary route changes.

Figure 2:
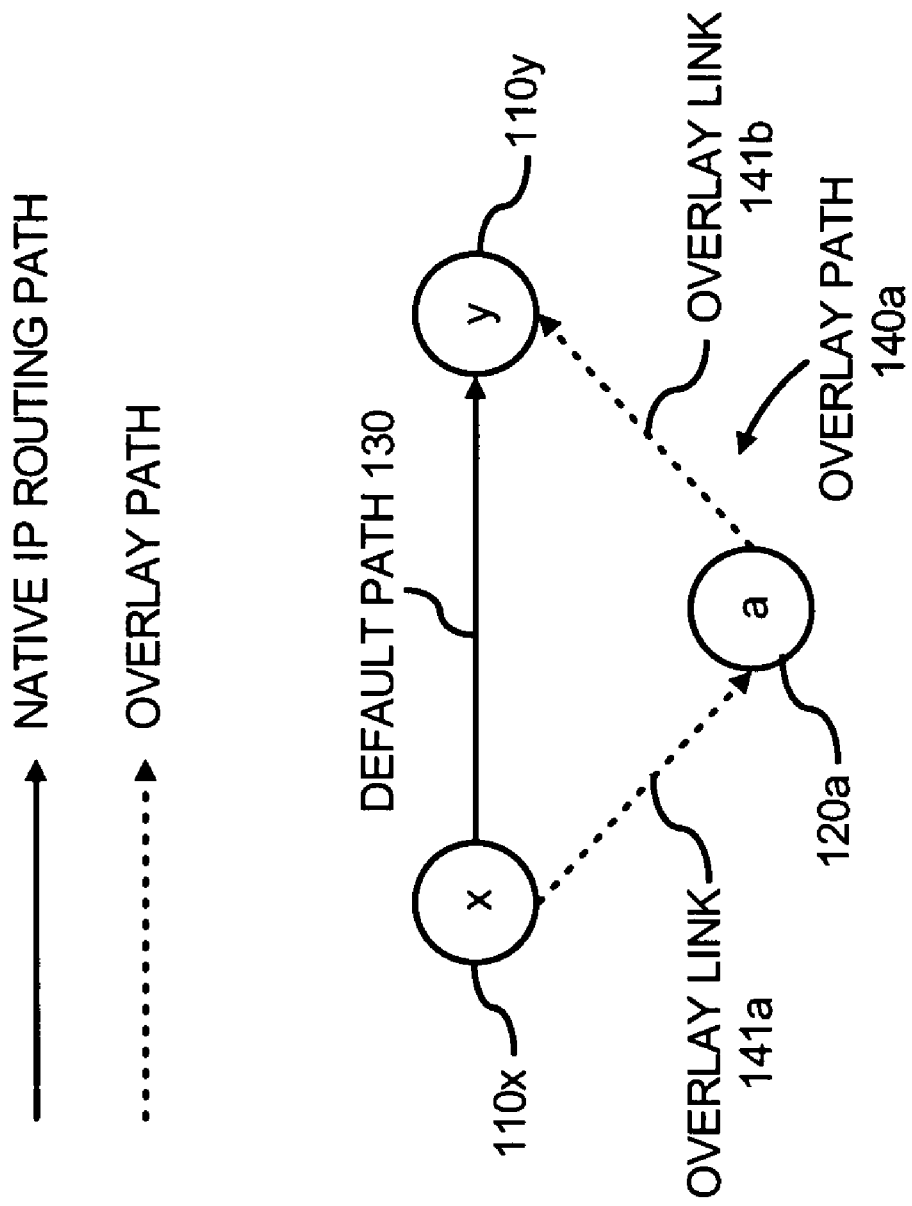
FIG. 2 illustrates an overlay network in the peer-to-peer network, according to an embodiment.

FIG. 2 shows the default path 130. Also shown is an overlay path 140a including overlay links 141a-b. If the capacity of the overlay path 140a is greater than the capacity of the default path 130*α, then the overlay path 140a is selected as a candidate overlay path.

Figure 3:
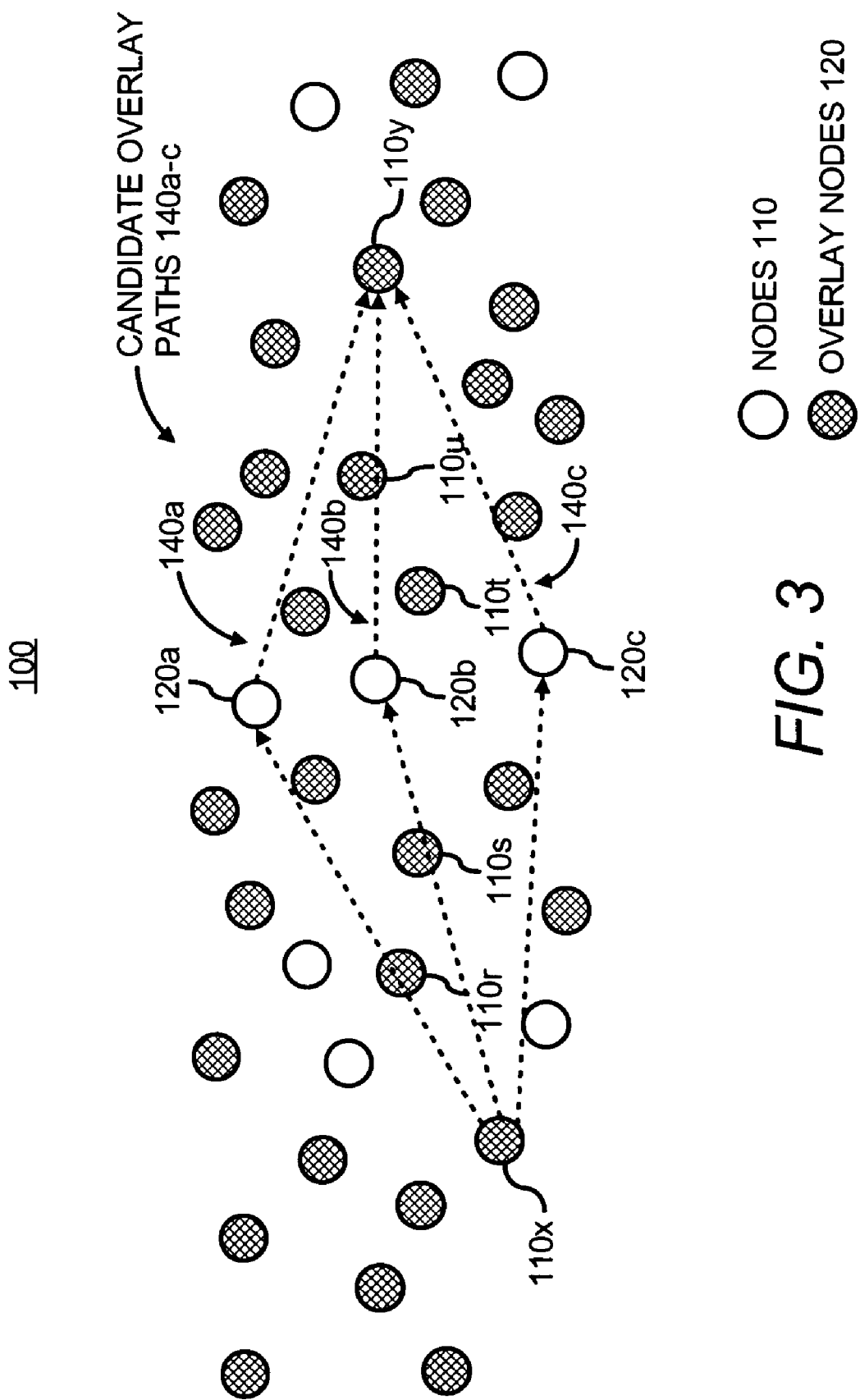
FIG. 3 illustrates candidate overlay paths, according to an embodiment.

Several overlay paths may qualify as candidate overlay paths based on the comparison to the path switching threshold. FIG. 3 illustrates candidate overlay paths 140a-c, including overlay nodes 120a-c, respectively.

An overlay path is selected from the candidate overlay paths 140a-c to be used instead of the default path 130. According to an embodiment, available bandwidth is used to select the overlay path from the candidate overlay paths 140a-c. For example, the overlay path 140a has the greatest available bandwidth when compared to the remaining candidate overlay paths 140b-c, and the overlay path 140a is selected as the new network path between the source node 110x and the destination node 110y. In this embodiment and other embodiments described below, instead of available bandwidth, another network metric, such a latency, loss rate, etc., may be used to select an overlay path from candidate overlay paths. Also, several networks metrics, instead of a single network metric, may be used to select the overlay path from candidate overlay paths.

A snapshot of network metrics may be used to select candidate overlay paths and to select the overlay path from the candidate overlay paths. For example, the overlay nodes 120 in the network 100 may periodically measure capacities for paths to all other nodes in the network 100 to obtain snapshots of the capacities for the overlay nodes 120. Measurements performed for a particular period of time are provided in a snapshot for the period. Alternatively, after the capacities are determined, capacities are only measured if the underlying path in an overlay path changes. For example, an overlay path may comprise several IP hops, shown as links in FIG. 1. If an IP hop for an overlay path changes, such is detected through traceroute or another tool, the capacity for the overlay path is measured. These new capacities are combined with the capacities for the unchanged overlay paths to determine a snapshot. The snapshot may include capacities that are valid for a specific period of time. Available bandwidth and other network metrics may also be periodically measured to determine a snapshot or may be measured as needed. Also, a snapshot may include measurements to a subset of nodes in the network 100 instead of measurements to all the nodes in the network 100.

In one embodiment, available bandwidth measurements, latency measurements and other measurements that take less time to perform than capacity measurements may be performed after the candidate overlay paths are selected and only for the candidate overlay paths.

Also, in the embodiments described herein, an overlay path may include more than one overlay node and more than one overlay hop. More than one overlay hop may be used if there is more than one intermediate overlay node between the source node and the destination node. More than one overlay node may be used to provide better capacity and/or available bandwidth. However, latency may be increased because the new overlay path with multiple overlay nodes may have more network hops. Thus, latency and other network metrics may be considered when selecting a new overlay path with multiple overlay nodes.

FIGS. 2 and 3 and other figures herein illustrate candidate overlay paths with one intermediate overlay node by way of example, and candidate overlay paths may include several intermediate overlay nodes. Also, FIG. 1 illustrates the source node 110x and the destination node 110y as non-overlay nodes. It will be apparent to one of ordinary skill in the art that one or both of the source and destination nodes may be an overlay node.

Also, FIGS. 1-3 illustrate switching from a default path 130 to an overlay path that, for example, provides better capacity and available bandwidth than the default path 130. The default path 130 may include a non-overlay path or the default path 130 may include an overlay path currently being used for routing between the source node 110x and the destination node 110y.

According to another embodiment, distributed information nodes (DINs) are used to partition the network 100 into regions based on latency or based on another network metric, and a DIN is assigned to each region for storing network metrics for nodes in the region, such as capacities, available bandwidth, and possibly other network metrics.

Figure 4A:
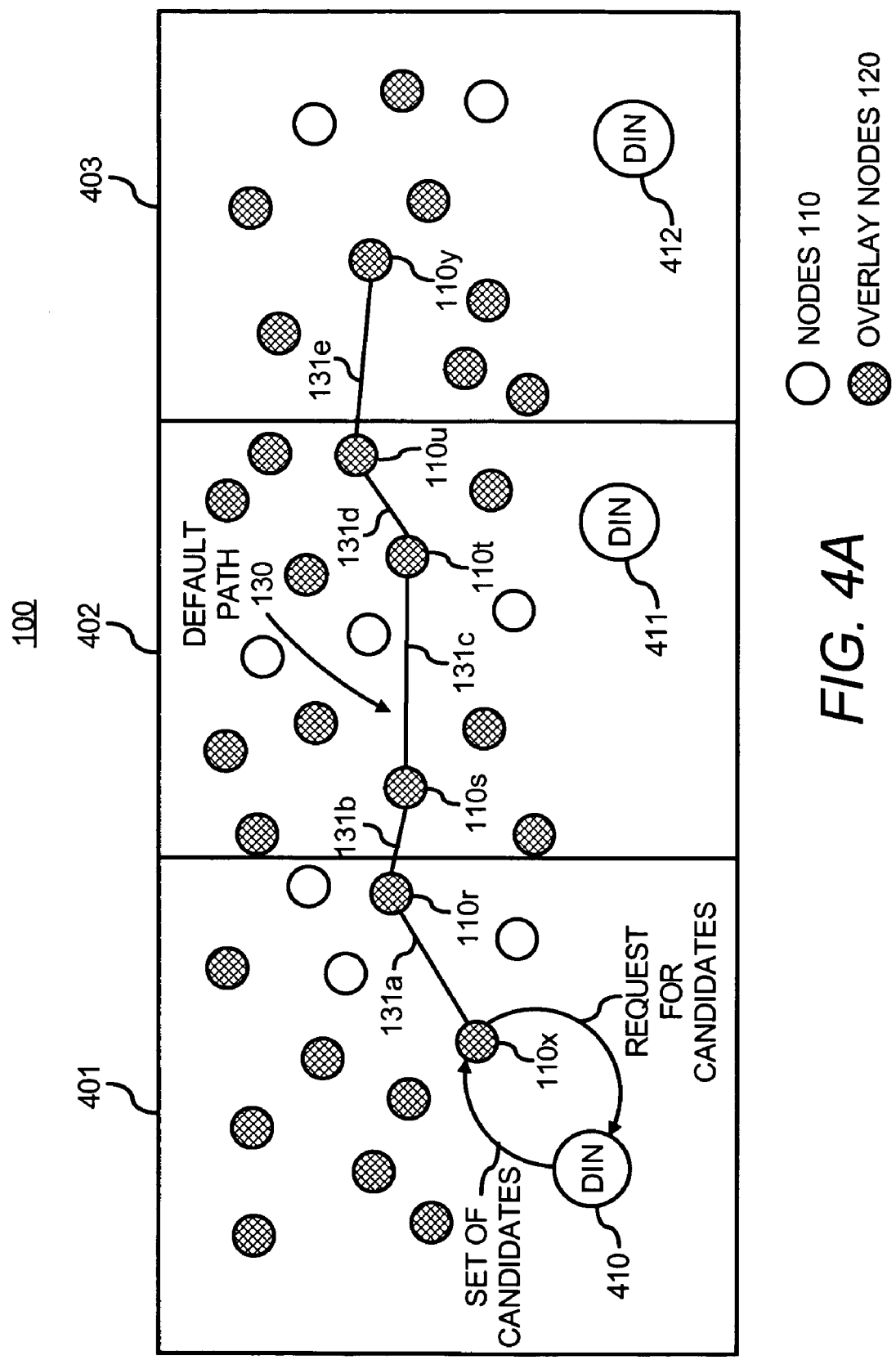
FIGS. 4A-C illustrate selecting an overlay path from candidate overlay paths having overlay nodes in the same region as a source node, according to an embodiment.

FIG. 4A illustrates three regions 401-403 in the network 100, and DINs 410-412 in the regions 401-403 respectively. Nodes in each of the regions 401-403 measure latency to the closest DINs and are assigned to one of the DINs 410-412 having the smallest latency. Other network metrics may also be used to determine which DIN is assigned to a region or node. The DINs 410-412 each store latencies and capacities for nodes in its region. Also, the DINs 410-412 each store capacities from nodes in its region to all nodes in the network 100 or to a subset of the nodes in the network 100. The DINs 410-412 may also store other network metrics for the nodes in their regions, such as available bandwidth.

FIG. 4A also shows the default path 130 from the source node 110x to the destination node 110y. When the source node 110x detects a problem, such as detecting a bottleneck link, such as the link 131c, using a network tool, the source node 110x contacts its DIN 410 to request a set of candidate overlay nodes and their respective overlay paths. The DIN 410 identifies the candidate overlay nodes in the same region 401 that satisfy one or more standards. For example, a path switching threshold, such as shown in equation 1, may be used to select the candidate overlay nodes and their respective candidate overlay paths.

Figure 4B:
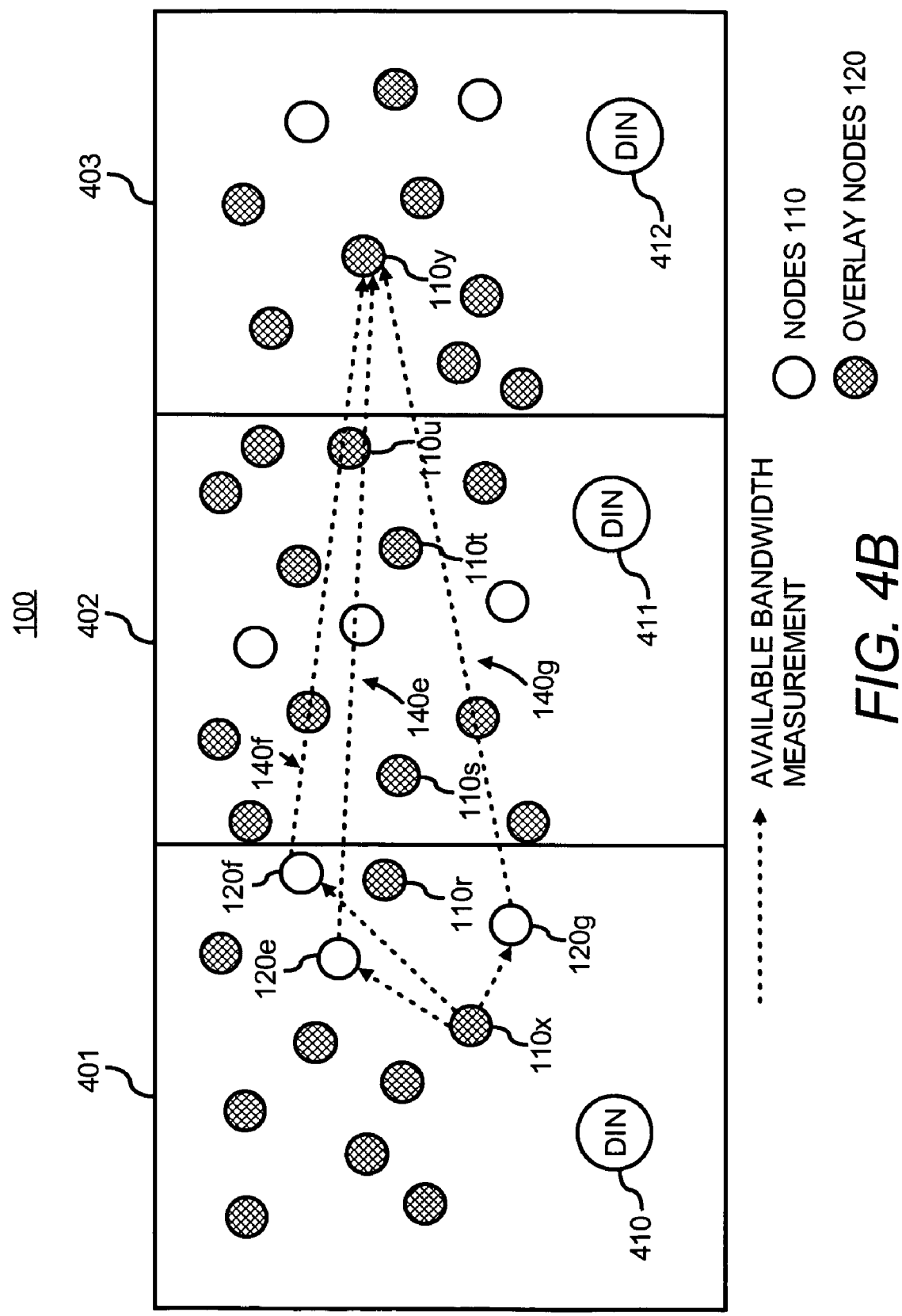
Figure 4C:
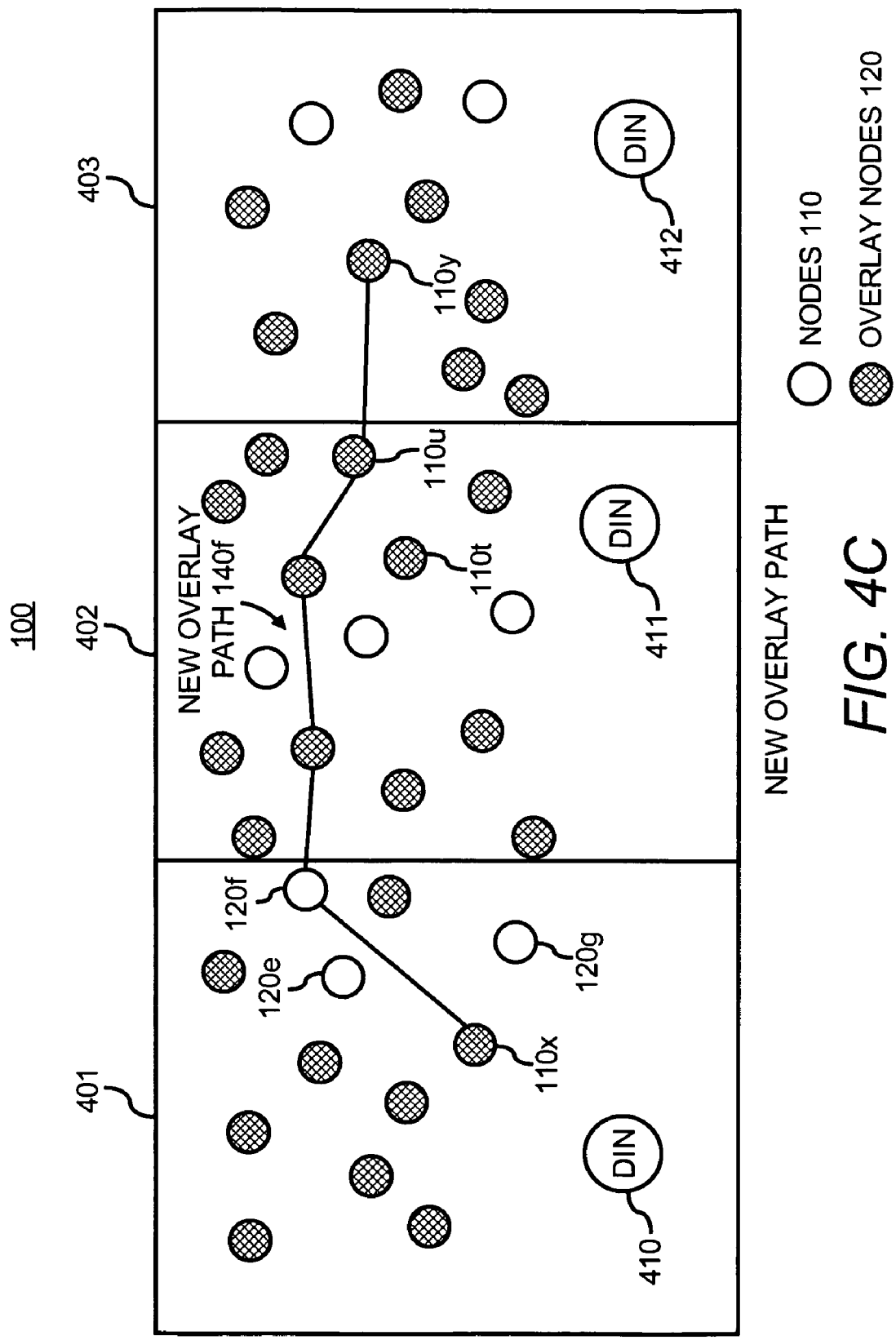

FIG. 4B illustrates three candidate overlay nodes 120e-g and their respective overlay paths 140e-g identified by the DIN 410. The source node 110x measures available bandwidth to each of the candidate overlay nodes 120e-g and reports the available bandwidths to the DIN 410. Also, each of the candidate overlay nodes 120e-g measures available bandwidth to the destination node 110y and reports the available bandwidth to the DIN 410. The DIN 410 selects a new overlay path, such as the overlay path 140f, from the candidate overlay paths 140e-g, such as shown in FIG. 4C. This new overlay path is then used for routing between the source node 110x and the destination node 110y. The overlay path 140f may include IP hops through non-overlay nodes, because the overlay routing may be used to determine a destination but an IP routing scheme may be used to transmit data to the destination.

Instead of the DIN 410 selecting the new overlay path from the candidate overlay paths, the source node 110x may be operable to select the new overlay path. In this embodiment, the source node 110x receives the available bandwidth measurements from each of the candidate overlay nodes 120e-g.

If the DIN 410 does not find a candidate overlay path that satisfies the predetermined standards, which may be based on the comparison provided in equation (1), the DIN 410 may contact a neighboring DIN to determine whether any candidate overlay nodes and their respective overlay paths are in a neighboring region.

Figure 5A:
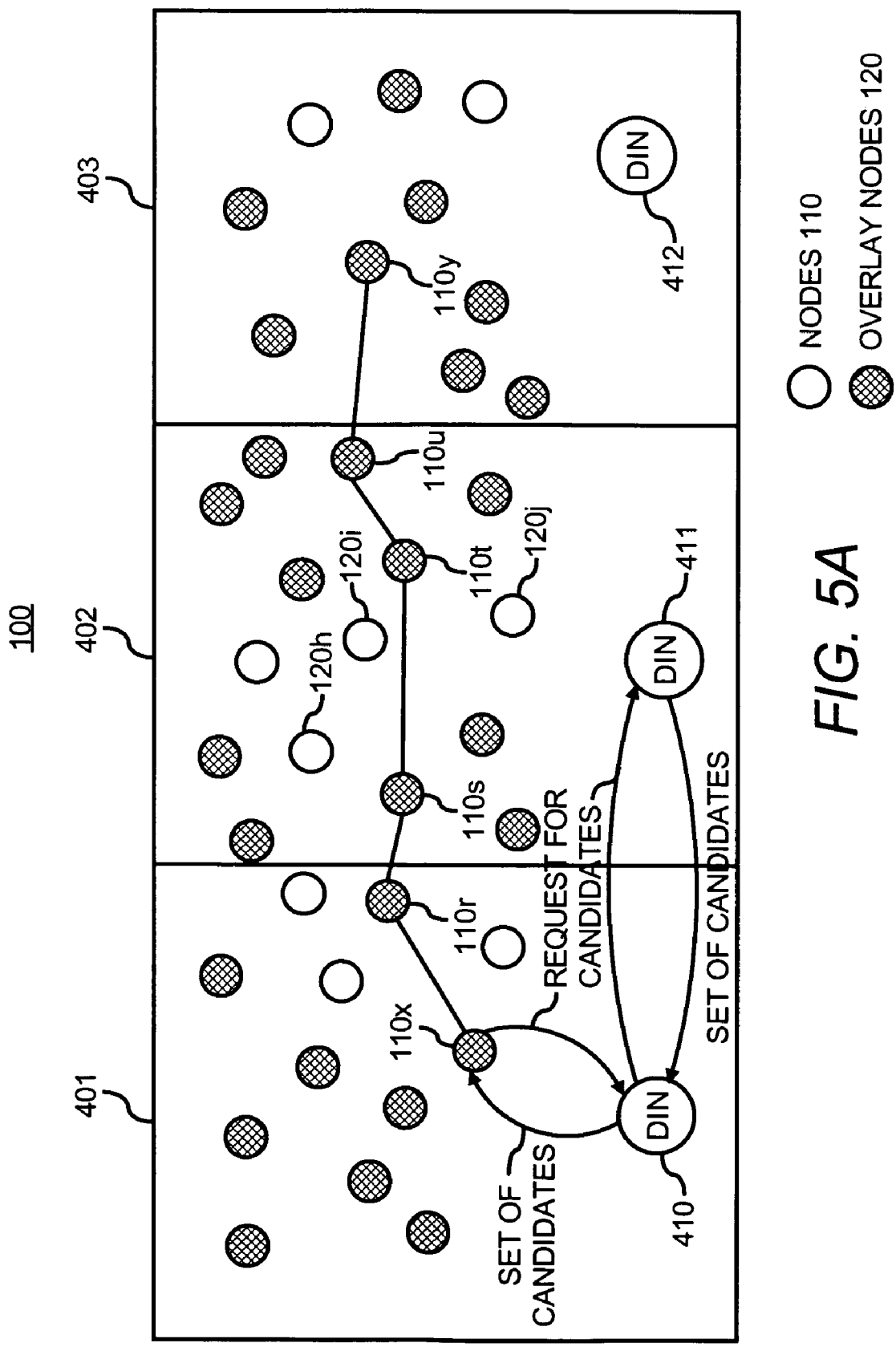
FIGS. 5A-C illustrate selecting an overlay path from candidate overlay paths having overlay nodes in a neighboring region of the source node, according to an embodiment.

FIG. 5A illustrates the DIN 410 sending a request for candidate overlay nodes and their respective paths to the neighboring DIN 411. The neighboring DIN 411 identifies, for example, the candidate overlay nodes 120h-j.

Figure 5B:
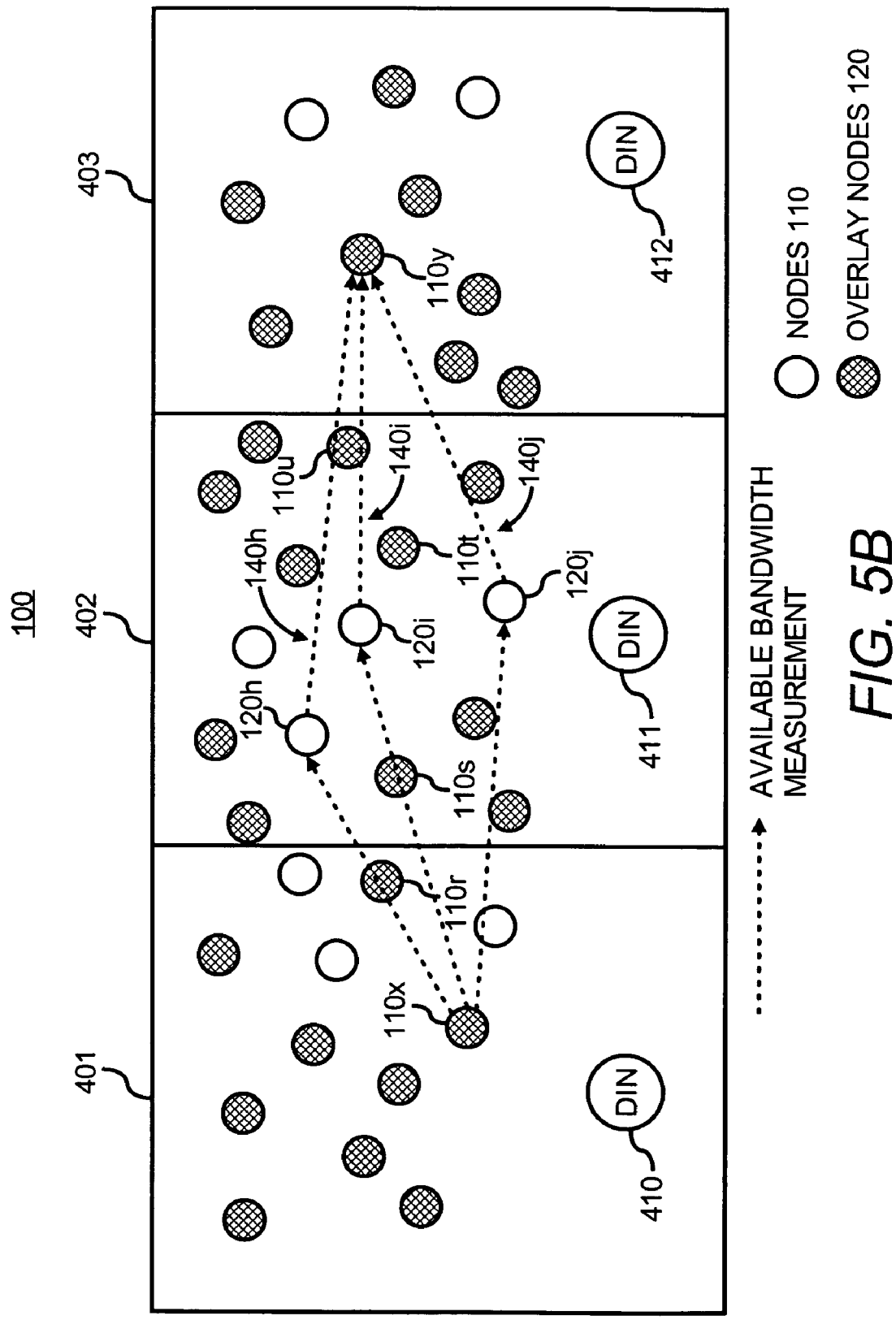
Figure 5C:
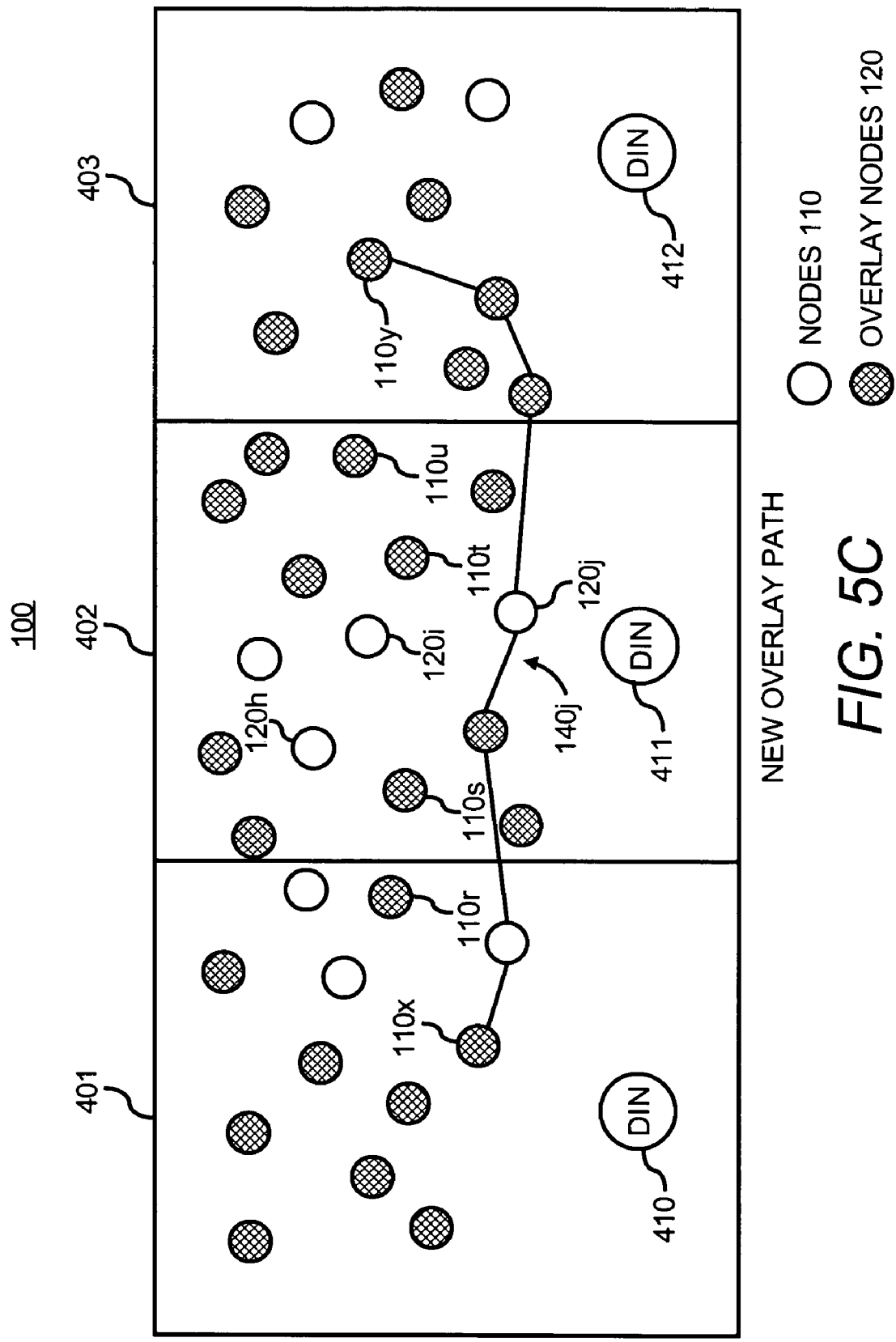

As shown in FIG. 5B, the source node 110x measures available bandwidth to each of the candidate overlay nodes 120h-j, and reports the available bandwidths to the DIN 410, and the reporting may be via the DIN 411. Also, each of the candidate overlay nodes 120h-j measures available bandwidth to the destination node 110y and reports the available bandwidth to the DIN 411, which forwards the available bandwidths to the DIN 410. The DIN 410 selects a new overlay path, such as the overlay path 140j, from the candidate overlay paths 140h-j, such as shown in FIG. 5C. The overlay path 140j may include IP hops through non-overlay nodes. Also, instead of the DIN 410 selecting the new overlay path, the source node 110x may be operable to select the new overlay path.

Figure 6A:
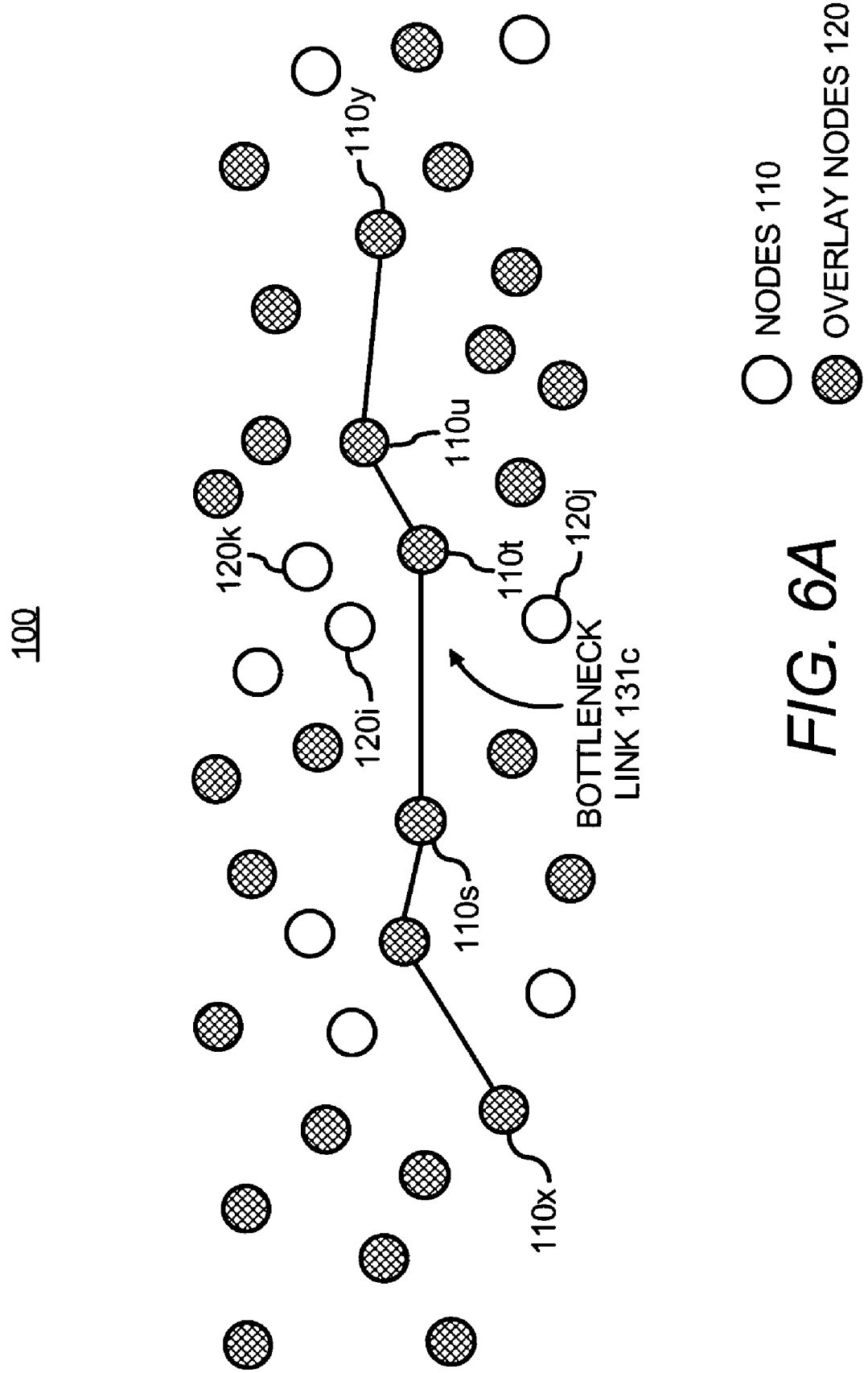

According to another embodiment, candidate overlay nodes are identified that are closest to a bottleneck link and one of the candidate overlay nodes is selected for a new overlay path. FIG. 6A illustrates the bottleneck link 131c in the default path 130. For example, the source node 110x finds the bottleneck link 131c using a known network tool. The source node 110x notifies the upstream node 110s that the node 110s is at the head of the bottleneck link 131c. The node 110s finds the closest overlay nodes to the node 110s, where closeness may be measured in terms of latency or another metric. The node 110s, for example, identifies the overlay nodes 120i-k as the closest overlay nodes and notifies the source node 110x that the overlay nodes 120i-k are the closest overlay nodes. The nodes 120i-k are the candidate overlay nodes in candidate overlay paths 140i-k. In one embodiment, the overlay nodes 120i-k are selected as candidate overlay nodes if the candidate overlay paths 140i-k satisfy predetermined standards, which may be based on the comparison provided in equation (1).

Figure 6B:
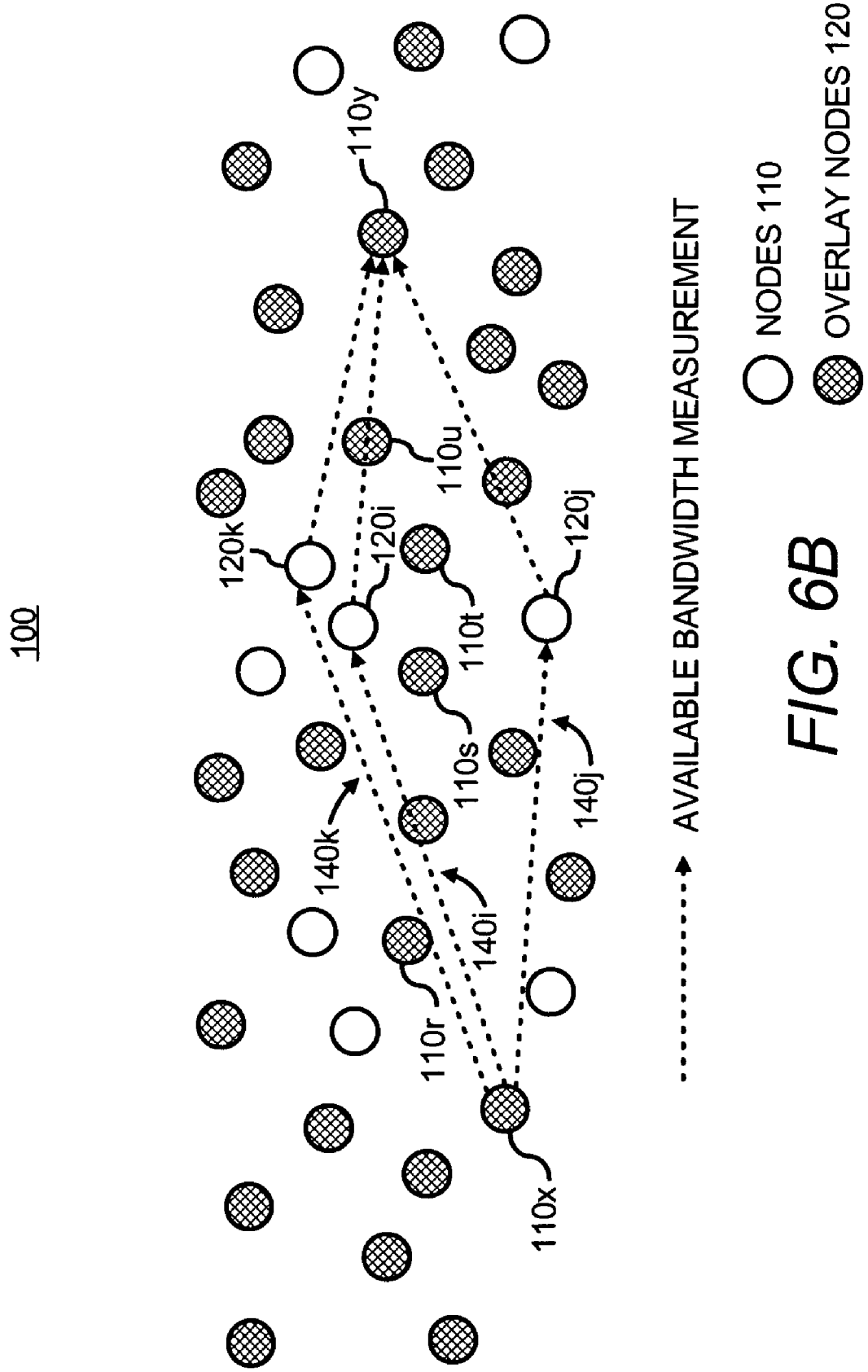

The source node 110x measures available bandwidth to each of the candidate overlay nodes 120i-k in the candidate overlay paths 140i-k, as shown in FIG. 6B. The candidate overlay nodes 120i-k each measure available bandwidth to the destination node 110y and report the available bandwidths to the source node 110x. The source node 110x selects a new overlay path based on the available bandwidth, such as the overlay path 140i shown in FIG. 6C.

According to another embodiment, both capacity and latency may be considered when selecting candidate overlay nodes and candidate overlay paths and/or when selecting a new overlay path from the candidate overlay paths. For example, candidate overlay paths are identified that satisfy equation (1), such as paths having a capacity greater than a times the capacity of the default path. Then, the paths with minimum latency are selected as the new candidate overlay paths, and the new overlay path is selected from the new candidate overlay paths. The new candidate overlay path with the smallest latency may be selected as the new overlay path. In another embodiment, both available bandwidth and latency are used to select the new overlay path. For example, from the new candidate overlay paths, the new candidate overlay path with the smallest latency and the greatest available bandwidth may be selected as the new overlay path.

In the embodiments described above, capacity may be used to select candidate overlay paths. Instead of capacity, other static network metrics may be used to select the candidate overlay paths. A static network metric is a network metric that does not change based on network traffic or user behavior. For example, capacity is an estimation of a transmission rate of a data transmission on a network path, assuming the data transmission has full access to the network path without any other network traffic on the network path. If a static metric other than capacity is used, in equation (1) the other static network metric may be substituted for capacity to select candidate overlay paths based on comparisons to the path switching threshold.

Also, in many of the embodiments described above, available bandwidth is used to select an overlay path from the candidate paths to be used as the new path for transmitting data between a source node and a destination node. Instead of available bandwidth, other time sensitive network metrics may be used to select a candidate path. A time sensitive network metric is a network metric that varies based on network traffic or user behavior and is generally more variable over time than a static network metric. Examples of time sensitive network metrics include but are not limited to available bandwidth, latency, loss rate, and TCP throughput.

Figure 7:
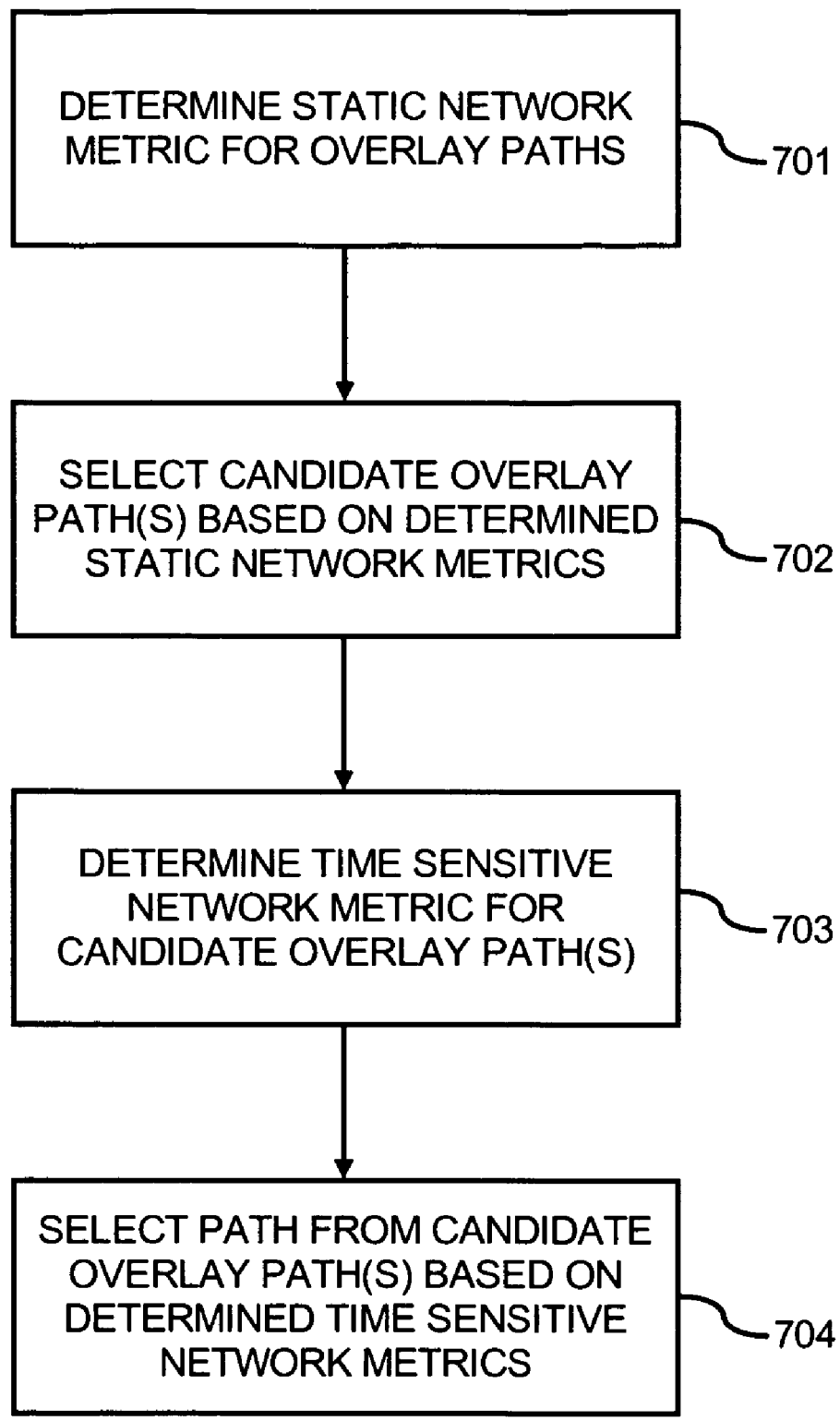
FIG. 7 illustrates a flow chart of a method for selecting a path, according to an embodiment.

FIG. 7 illustrates a method 700 for selecting a path in a network, according to an embodiment. The method 700 may be described with respect to one or more of FIGS. 1-6C by way of example, and the method 700 may be used in other systems and networks.

At step 701, a static network metric is determined for each of a plurality of overlay paths between two nodes in the network. For example, overlay paths that may be used for transmitting data between the source node 110x and the destination node 110y shown in FIG. 1 are identified. A static network metric, such as capacity or another static network metric, is determined for each of the overlay paths. Network metric measurement tools known in the art may be used to measure or estimate the same static network metric for each overlay path. For example, capacity is determined for each overlay path.

At step 702, one or more overlay paths are selected as candidate overlay paths based on the determined static network metrics. For example, the static network metrics for the overlay paths are compared to one or more predetermined standards, such as the path switching threshold in equation (1). If the static network metric for an overlay path satisfies the one or more predetermined standards, the overlay path may be selected as a candidate overlay path.

At step 703, a time sensitive network metric is determined for each of the candidate overlay paths. Network metric measurement tools known in the art may be used to measure or estimate the same time sensitive network metric for each candidate overlay path. For example, available bandwidth is determined for each candidate overlay path.

At step 704, a path from the candidate overlay paths is selected based on the time sensitive network metrics. This may include a candidate overlay path having the greatest available bandwidth. The path may be selected from the candidate overlay paths using multiple network metrics, such as available bandwidth and latency or other time sensitive network metrics.

Figure 8:
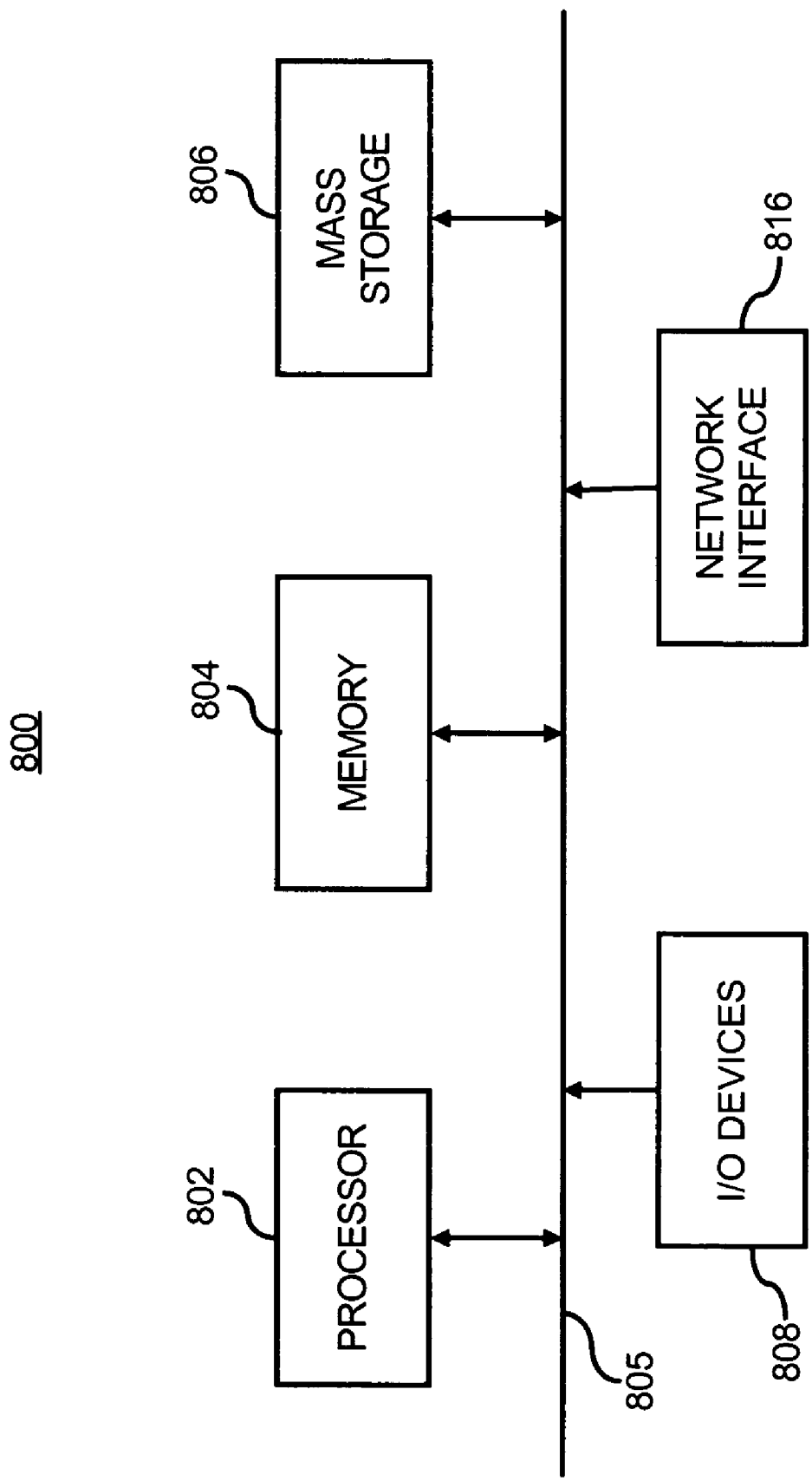
FIG. 8 illustrates a computer system, according to an embodiment.

FIG. 8 illustrates an exemplary block diagram of a computer system 800 that may be used as a node in the network 100. The computer system 800 includes one or more processors, such as processor 802, providing an execution platform for executing software.

Commands and data from the processor 802 are communicated over a communication bus 805. The computer system 800 also includes a main memory 804, such as a Random Access Memory (RAM), where software may be resident during runtime, and a secondary memory 806. The secondary memory 806 includes, for example, a hard disk drive and/or a removable storage drive, representing a floppy diskette drive, a magnetic tape drive, a compact disk drive, etc., or a nonvolatile memory where a copy of the software may be stored. The secondary memory 806 may also include ROM (read only memory), EPROM (erasable, programmable ROM), EEPROM (electrically erasable, programmable ROM). In addition to software for routing and other steps described herein, routing tables, capacities for overlay paths, available bandwidths for overlay paths, and other data may be stored in the main memory 804 and/or the secondary memory 806.

A user interfaces with the computer system 800 with one or more I/O devices 808, such as a keyboard, a mouse, a stylus, display, and the like. A network interface 816 is provided for communicating with other nodes in the network 100.

One or more of the steps of the method 700 and other steps described herein may be implemented as software embedded on a computer readable medium, such as the memory 804 and/or 806, and executed on the computer system 800, for example, by the processor 802. The steps may be embodied by a computer program, which may exist in a variety of forms both active and inactive. For example, they may exist as software program(s) comprised of program instructions in source code, object code, executable code or other formats for performing some of the steps. Any of the above may be embodied on a computer readable medium, which include storage devices, in compressed or uncompressed form. Examples of suitable computer readable storage devices include conventional computer system RAM (random access memory), ROM (read only memory), EPROM (erasable, programmable ROM), EEPROM (electrically erasable, programmable ROM), and magnetic or optical disks or tapes. Examples of computer readable signals, whether modulated using a carder or not, are signals that a computer system hosting or running the computer program may be configured to access, including signals downloaded through the Internet or other networks. Concrete examples of the foregoing include distribution of the programs on a CD ROM or via Internet download. In a sense, the Internet itself, as an abstract entity, is a computer readable medium. The same is true of computer networks in general. It is therefore to be understood that those functions enumerated below may be performed by any electronic device capable of executing the above-described functions.

While the embodiments have been described with reference to examples, those skilled in the art will be able to make various modifications to the described embodiments without departing from the scope of the claimed embodiments.

What is claimed is:

1. A method of selecting a path in a network, the method comprising:

determining a static network metric for each of a plurality of overlay paths between two nodes in the network, wherein the two nodes comprise a source node and a destination node, wherein the network is divided into a plurality of regions based on a network metric and the plurality of overlay paths include overlay nodes in a region of the plurality of regions of the network that also includes the source node;

selecting a subset of a plurality of overlay paths as candidate paths based on the determined static network metrics, and the selecting a subset of the plurality of overlay paths further includes determining whether any of the plurality of overlay paths is a candidate path of the candidate paths based on a comparison of the static network metrics for the plurality of overlay paths to a path switching threshold;

if no overlay paths including an overlay node from the region of the source node are selected as candidate paths, determining the static network metrics for a second plurality of overlay paths between the source node and the destination node, wherein the second plurality of overlay paths include overlay nodes in a neighboring region to the region of the source node; and selecting a subset of the second plurality of overlay paths as candidate paths based on a comparison of the static network metrics for the second plurality of overlay paths to the path switching threshold;

determining a time sensitive network metric for each of the candidate paths; and selecting by a device an overlay path from the candidate paths for transmitting data between the two nodes based on the determined time sensitive network metric for each of the candidate paths.

2. The method of claim 1, wherein selecting a subset of a plurality of overlay paths as candidate paths further comprises:

comparing the static network metrics for the plurality of overlay paths to a path switching threshold to select the subset of a plurality of overlay paths.

3. The method of claim 1, further comprising:

determining a snapshot including the static network metrics for the plurality of overlay paths; and selecting a subset of a plurality of overlay paths as candidate paths comprises selecting the subset of the plurality of overlay paths using the static network metrics from the snapshot.

4. The method of claim 3, wherein the snapshot also comprises the time sensitive network metric for overlay paths in the network; and
determining a time sensitive network metric for each of the candidate paths comprises determining the time sensitive metric for each of the candidate paths from the snapshot.

5. The method of claim 3, further comprising:
for each path of the plurality of overlay paths, measuring the static network metric when a change in an underlying path for the overlay path is detected; and
determining a snapshot of the static network metrics comprises determining the snapshot of the static network metrics using the static network metrics measured when the changes are detected.

6. The method of claim 1, wherein the static metric comprises capacity.

7. The method of claim 1, wherein the time sensitive metric comprises at least one of available bandwidth and latency.

8. The method of claim 1, wherein selecting a path from the candidate paths for transmitting data between the two nodes comprises:
selecting the path based on at least one other network metric for the candidate paths.

9. The method of claim 8 wherein the time sensitive metric comprises latency and the at least one other network metric comprises available bandwidth, the method further comprising:
determining an available bandwidth only for the candidate paths having a latency less than a predetermined threshold.

10. The method of claim 1, wherein a distributed information node is associated with each of the plurality of regions in the network and stores the static network metrics for nodes in an associated region, the method further comprising:
determining the static network metrics for the plurality of overlay paths from the static network metrics stored in the distributed information node for the region where the overlay nodes of the plurality of overlay paths reside; and
determining the static network metrics of the second plurality of overlay paths from the static network metrics stored in the distributed information node for the neighboring region.

11. The method of claim 1, wherein the two nodes comprise a source node and a destination node the method further comprising:
determining a bottleneck link in a currently used network path between the source node and the destination node; and
determining closest overlay nodes to a node at a head of the bottleneck link, wherein at some of the closest overlay nodes comprises overlay nodes in the candidate paths.

12. A computer program embedded on a non-transitory tangible computer readable storage medium, the computer program including instructions that when executed by a processor implement a method comprising:
selecting a subset of a plurality of overlay paths as candidate paths between two nodes in the network based on a static network metric determined for each of the plurality of overlay paths, wherein the two nodes comprise a source node and a destination node, wherein the network is divided into a plurality of regions based on a network metric and the plurality of overlay paths include overlay nodes in a region of the plurality of regions of the network that also includes the source node, and the selecting a subset of the plurality of overlay paths further includes
determining whether any of the plurality of overlay paths is a candidate path of the candidate paths based on a comparison of the static network metrics for the plurality of overlay paths to a path switching threshold;
if no overlay paths including an overlay node from the region of the source node are selected as candidate paths, determining the static network metrics for a second plurality of overlay paths between the source node and the destination node, wherein the second plurality of overlay paths include overlay nodes in a neighboring region to the region of the source node; and
selecting a subset of the second plurality of overlay paths as candidate paths based on a comparison of the static network metrics for the second plurality of overlay paths to the path switching threshold;
determining a time sensitive network metric for each of the candidate paths; and
selecting by a device a path from the candidate paths for transmitting data between the two nodes based on determined time sensitive network metrics.

13. The computer program of claim 12, wherein selecting a subset of a plurality of overlay paths as candidate paths further comprises:
comparing the static network metrics for the plurality of overlay paths to a path switching threshold to select the subset of a plurality of overlay paths.

14. The computer program of claim 12, wherein selecting a path from the candidate paths for transmitting data between the two nodes comprises:
selecting the path based on the available bandwidths and latency for each of the candidate paths.

15. The computer program of claim 12, wherein selecting a subset of a plurality of overlay paths as candidate paths comprises:
selecting the subset of the plurality of overlay paths as candidate paths based on capacities for the plurality of overlay paths.

16. The computer program of claim 12, wherein the two nodes comprise a source node and a destination node and the method further comprises:
determining a bottleneck link in a currently used network path between the source node and the destination node; and
determining closest overlay nodes to a node at a head of the bottleneck link, wherein at some of the closest overlay nodes comprises overlay nodes in the candidate paths.

17. A node in a network, the node comprising:
a memory storing a static network metric for each of a plurality of overlay paths and storing a time sensitive network metric for at least some of the overlay paths;
a processor operable to select a subset of the overlay paths as candidate paths for transmitting data to a destination node from a source node based on the stored static network metrics for the overlay paths,
wherein the network is divided into a plurality of regions based on a network metric and the plurality of overlay paths include overlay nodes in a region of the plurality of regions of the network that also includes the source node, and the selection of the candidate paths further includes
determining whether any of the plurality of overlay paths is a candidate path of the candidate paths based on a comparison of the static network metrics for the plurality of overlay paths to a path switching threshold;

if no overlay paths including an overlay node from the region of the source node are selected as candidate paths, determining the static network metrics for a second plurality of overlay paths between the source node and the destination node, wherein the second plurality of overlay paths include overlay nodes in a neighboring region to the region of the source node; and selecting a subset of the second plurality of overlay paths as candidate paths based on a comparison of the static network metrics for the second plurality of overlay paths to the path switching threshold, the processor being further operable to select an overlay path from the candidate paths as a new path for transmitting data to the destination node based on the stored time sensitive network metrics for the candidate paths.

* * * * *

UNITED STATES PATENT AND TRADEMARK OFFICE
CERTIFICATE OF CORRECTION

PATENT NO.        : 7,643,426 B1
APPLICATION NO. : 11/412442
DATED             : January 5, 2010
INVENTOR(S)       : Sung-Ju Lee et al.

It is certified that error appears in the above-identified patent and that said Letters Patent is hereby corrected as shown below:

In column 8, line 33-40, in Claim 1, delete "selecting a subset of a plurality of overlay paths as candidate paths based on the determined static network metrics, and the selecting a subset of the plurality of overlay paths further includes determining whether any of the plurality of overlay paths is a candidate path of the candidate paths based on a comparison of the static network metrics for the plurality of overlay paths to a path switching threshold;"
and insert -- selecting a subset of a plurality of overlay paths as candidate paths based on the determined static network metrics, and the selecting a subset of the plurality of overlay paths further includes:
determining whether any of the plurality of overlay paths is a candidate path of the candidate paths based on a comparison of the static network metrics for the plurality of overlay paths to a path switching threshold; --, therefor.

Signed and Sealed this

Twelfth Day of October, 2010

David J. Kappos
*Director of the United States Patent and Trademark Office*